(12) United States Patent
Curran et al.

(10) Patent No.: US 7,316,378 B1
(45) Date of Patent: Jan. 8, 2008

(54) ADJUSTABLE BRACKET ASSEMBLY FOR SHELF-MOUNTED ELECTRONIC DISPLAY DEVICE

(75) Inventors: Michael A. Curran, Westerville, OH (US); James Hogan, Gahanna, OH (US); Gary Peck, Westerville, OH (US)

(73) Assignee: Micro Industries Corporation, Westerville, OH (US)

( * ) Notice: Subject to any disclaimer, the term of this patent is extended or adjusted under 35 U.S.C. 154(b) by 263 days.

(21) Appl. No.: 10/938,104

(22) Filed: Sep. 10, 2004

(51) Int. Cl.
*A47F 5/00* (2006.01)
(52) U.S. Cl. .................................................. 248/298.1
(58) Field of Classification Search .............. 248/200, 248/300, 220.31, 917, 919, 298.1, 276.1, 248/286.1, 287.1
See application file for complete search history.

(56) References Cited

U.S. PATENT DOCUMENTS

| 817,564 | A | * | 4/1906 | Howe | 248/231.71 |
| 5,405,117 | A | * | 4/1995 | Davis | 248/333 |
| 5,833,337 | A | * | 11/1998 | Kofstad | 312/334.5 |
| 6,478,275 | B1 | * | 11/2002 | Huang | 248/284.1 |

* cited by examiner

*Primary Examiner*—Robert Pezzuto
*Assistant Examiner*—Dat T. Nguyen
(74) *Attorney, Agent, or Firm*—Standley Law Group LLP

(57) ABSTRACT

An adjustable bracket assembly for mounting an electronic display device to a shelf, such as, for example, a shelf of a retail store. The adjustable bracket assembly allows for the mounting of an electronic display device to shelving of different width and does not require any alteration of the shelving. The electronic display device may be mounted at different locations with respect to the shelf. The design of the adjustable bracket assembly preferably allows for useable shelf space to exist behind the electronic display device once it is installed to the shelf. The adjustable bracket assembly may also allow for attachment of a printer, or a printer housing.

32 Claims, 16 Drawing Sheets

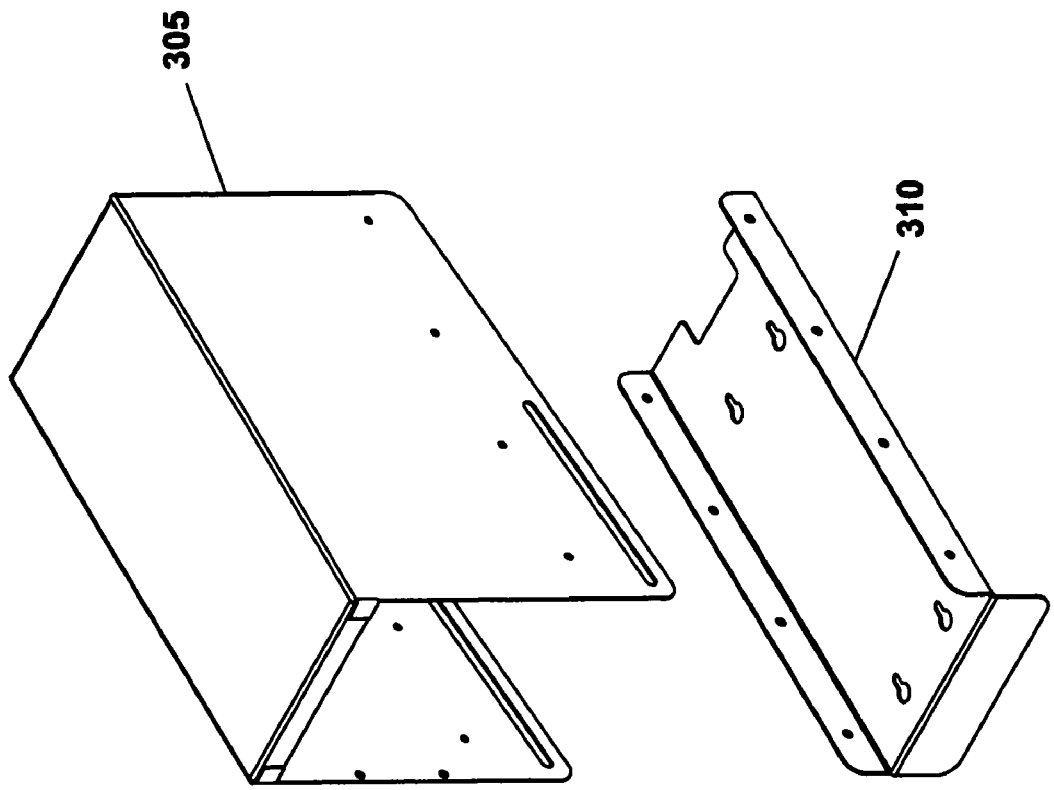
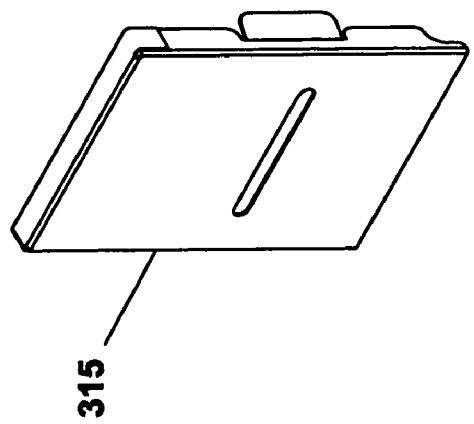
FIG. 13

ADJUSTABLE BRACKET ASSEMBLY FOR SHELF-MOUNTED ELECTRONIC DISPLAY DEVICE

BACKGROUND AND SUMMARY OF THE INVENTION

The present invention is related to the mounting of electronic display devices for displaying information to patrons of a business establishment. More particularly, the present invention is directed to an adjustable bracket that can be used to mount an electronic display monitor or mini-computer to a shelf of a retail store or similar business so that pricing and/or other product information can be provided to a customer in electronic form.

Present day retail establishments, particularly non-specialty establishments, typically stock a plethora of different goods. Not only do such establishments commonly stock goods of many types, they often stock different products or brands of products within a particular class of goods. Each of these products typically requires that pricing and/or other product-specific information be displayed in relation thereto.

As consumers have become more interested in the specifics of many of the products they purchase, such as foodstuffs, for example, manufacturers have correspondingly made more product information available to the public. Thus, with the multitude of products available to today's consumer, and the wealth of information that now commonly exists with respect to such products, it is desirable for retail establishments to provide the consumer with an on-site and efficient means of accessing this additional information.

Consequently, in the retail business especially, it would be convenient to be able to present the consumer with all, or a large portion of such information at a single source. For example, when considering a foodstuff, typical information may be related to rebate instructions, the existence of coupons, or special pricing. The information may also be more product specific, such as the product's nutritional information, for example. Certainly, it can be understood that depending on the particular type of products considered and the level of detail desired, the amount of information that may be provided can be substantial.

To this end, it has been discovered that electronic displays are an excellent means of providing a large and diverse amount of information to a consumer in an efficient manner. The electronic displays may be of such a size that they can be effectively located at or near a product display without requiring excessive space. Such electronic displays may be provided for by using a monitor connected to a remote computer. Alternatively, and more preferably, a stand-alone mini computer having an integrated display may be used. One such stand-alone computer that is especially well-suited to use for this purpose is described in U.S. patent application Ser. No. 10/937,976, entitled *Fanless Computer With Integrated Display* and filed on Sep. 10, 2004. Such electronic displays may provide information via a non-changing display screen, or a touch screen or other means may be provided to allow a customer to access additional information. Therefore, the amount of information that may be provided via these electronic displays is virtually endless.

Because products are typically displayed on shelves, particularly in a retail store setting, it is desirable to be able to locate these electronic displays on the shelves as well. However, it has been discovered that retail store shelving is of varying size, without any particular set of standards. Consequently, a mounting device developed to attach an electronic display device to one specific type/size of shelving may not work to mount the display device to shelving of a different type/size. This is problematic for several reasons. First, a single retail establishment may utilize shelving of various size—such as to accommodate differently sized products. Thus, a single retail establishment employing these electronic displays would be forced to maintain a supply of dissimilar mounting devices. Additionally, in order to facilitate attachment of such electronic display devices to the various sizes and types of shelving in existence, an entity that wishes to supply and/or install the displays to retail sales and other customers would also have to stock what could be a considerable number of different mounting devices.

Aside from issues of varying shelf size, it has also been found that display shelving is often constructed or rather thin materials. As a result, such shelves may not exhibit a desirable amount of stability subsequent to the attachment of an electronic display device thereto. This situation may be especially problematic when employing electronic display devices incorporating touch screens, for example, as the interaction between a customer and the display device may put additional stress on the shelf to which the display device is mounted.

Therefore, from the foregoing, it can be understood that what is desirable is a mounting device that can be used to attach an electronic display device to shelving of various size. The adjustable bracket assembly of the present invention fulfills this desire. The adjustable bracket assembly of the present invention allows an electronic display to be easily attached to shelving having a considerably different depth, as well as a different height. The adjustable bracket assembly also facilitates the removal or relocation of an electronic display device, and acts to strengthen and stabilize shelving constructed of weak materials.

While retail store shelving may be of varying size, it has been determined that there is at least one feature common to each size—a series of holes that reside near the rear of the top surface thereof. In addition, the different sizes of shelving generally fall within a range of depths and thicknesses. The adjustable bracket assembly of the present invention makes use of these shelving features to allow the bracket assembly to be easily but securely affixed to a wide variety of shelving.

The adjustable bracket assembly preferably includes a substantially C-shaped front bracket arranged in a sliding relationship with a rear bracket having an upwardly extending portion. The brackets may be slidably displaced and secured in position to accommodate shelving of different depth. The C-shaped front bracket is provided with ample spacing between a bottom leg and a top surface leg thereof to also accommodate shelving of different height. The shape of the front bracket allows it to trap a portion of the shelf to which it is installed. One or more fasteners or similar devices may be used to releasably secure the position of the front bracket to the shelf. The position of the rear bracket is preferably secured by passing a threaded fastener through one of the aforementioned holes in the shelf, and thereafter securing the bracket to the shelf with a like-threaded nut.

The adjustable bracket assembly also includes an electronic display mounting bracket for attaching electronic display device to the bracket assembly. Preferably, the electronic display mounting bracket is attached to the C-shaped front bracket so that the electronic display device is located near the front of the shelf. The electronic display mounting bracket may have different configurations to allow the vertical position of the electronic display to be set at different levels with respect to the shelf.

A printer may also be associated with the shelf by attaching the printer (or a printer housing) to the adjustable bracket assembly. Preferably, the printer is attached to the adjustable bracket assembly in a hanging arrangement, such that the printer resides below the shelf. Other arrangements are, of course, also possible.

A printer housing may be provided to house the printer and to provide a surface for attachment of the printer to the adjustable bracket assembly. In one embodiment, the housing may consist of several individual components, including an enclosure, a base, and a front cover. A printer mounting bracket may be used to facilitate attachment of the housing to the adjustable bracket assembly.

The design of the adjustable bracket assembly not only makes it easy to install an electronic display to a shelf, it also allows use of the shelf space behind the area of the electronic display device. More specifically, because only the top leg of the C-shaped front bracket resides above the top surface of the shelf when installed thereto, a majority of the shelf space behind the electronic display will still be available for displaying products. Additionally, because provisions are preferably made for allowing power and communication cables to be routed through a portion of the adjustable bracket assembly residing beneath the shelf, no additional space is occupied thereby. Thus, the adjustable bracket assembly of the present invention provides for an easy, adaptable, and space conserving means of securely mounting an electronic display device to a shelf.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 13 depicts the printer housing of FIG. 12 in a disassembled state;

DETAILED DESCRIPTION OF THE EXEMPLARY EMBODIMENT(S)

Figure 1:
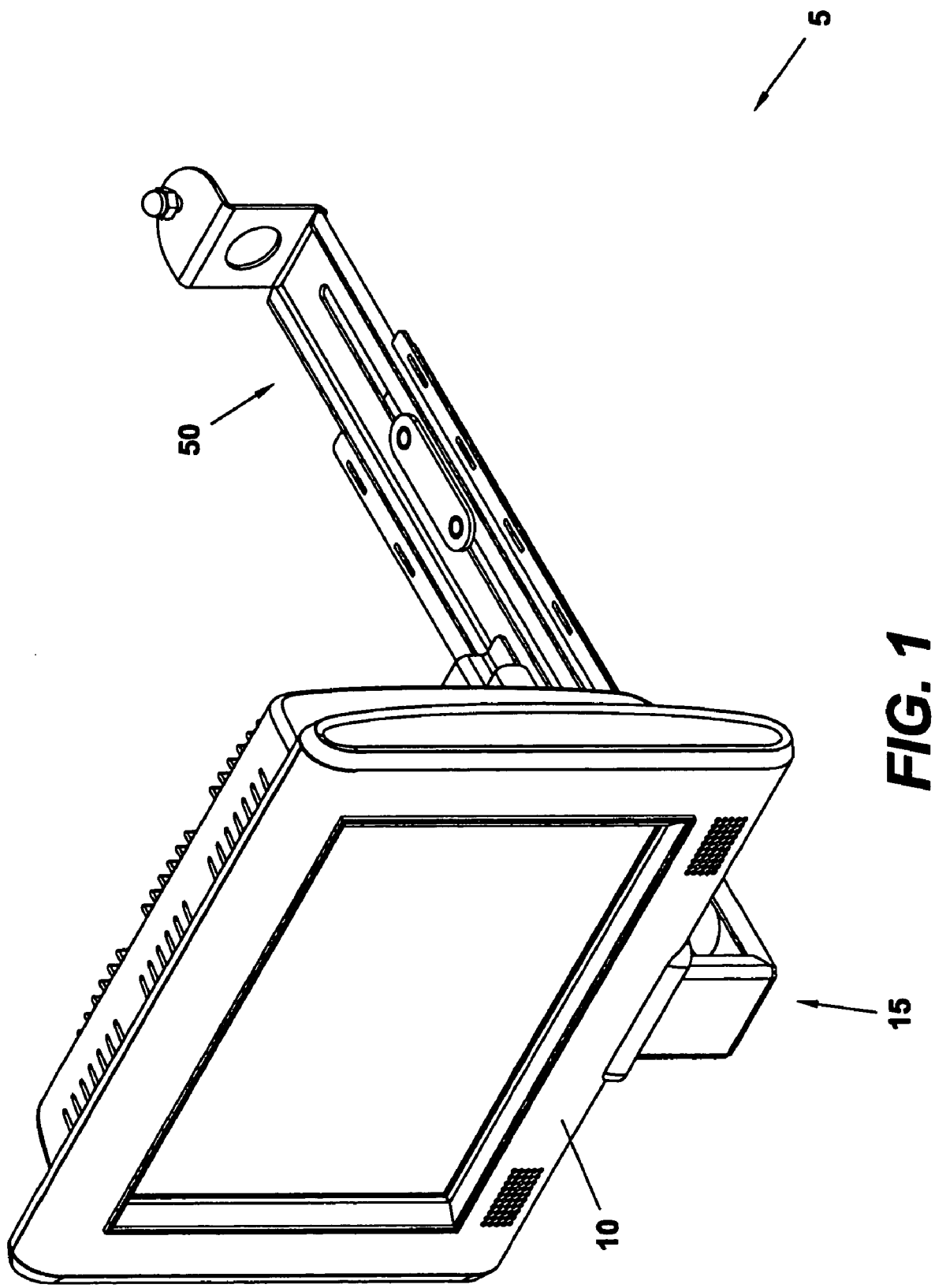
FIG. 1 is a perspective view of one embodiment of an assembled adjustable bracket assembly of the present invention, wherein an electronic display device consisting of a mini computer having an integrated display is attached thereto.

One exemplary embodiment of an assembled adjustable bracket assembly 5 of the present invention can be seen in FIG. 1 with an electronic display device 10 attached thereto. In this particular embodiment, the electronic display device 10 is a mini computer having an integrated display. However, it should also be realized that the electronic display device 10 could simply be a monitor connected to a remote computer, or another similar device.

Figure 2:
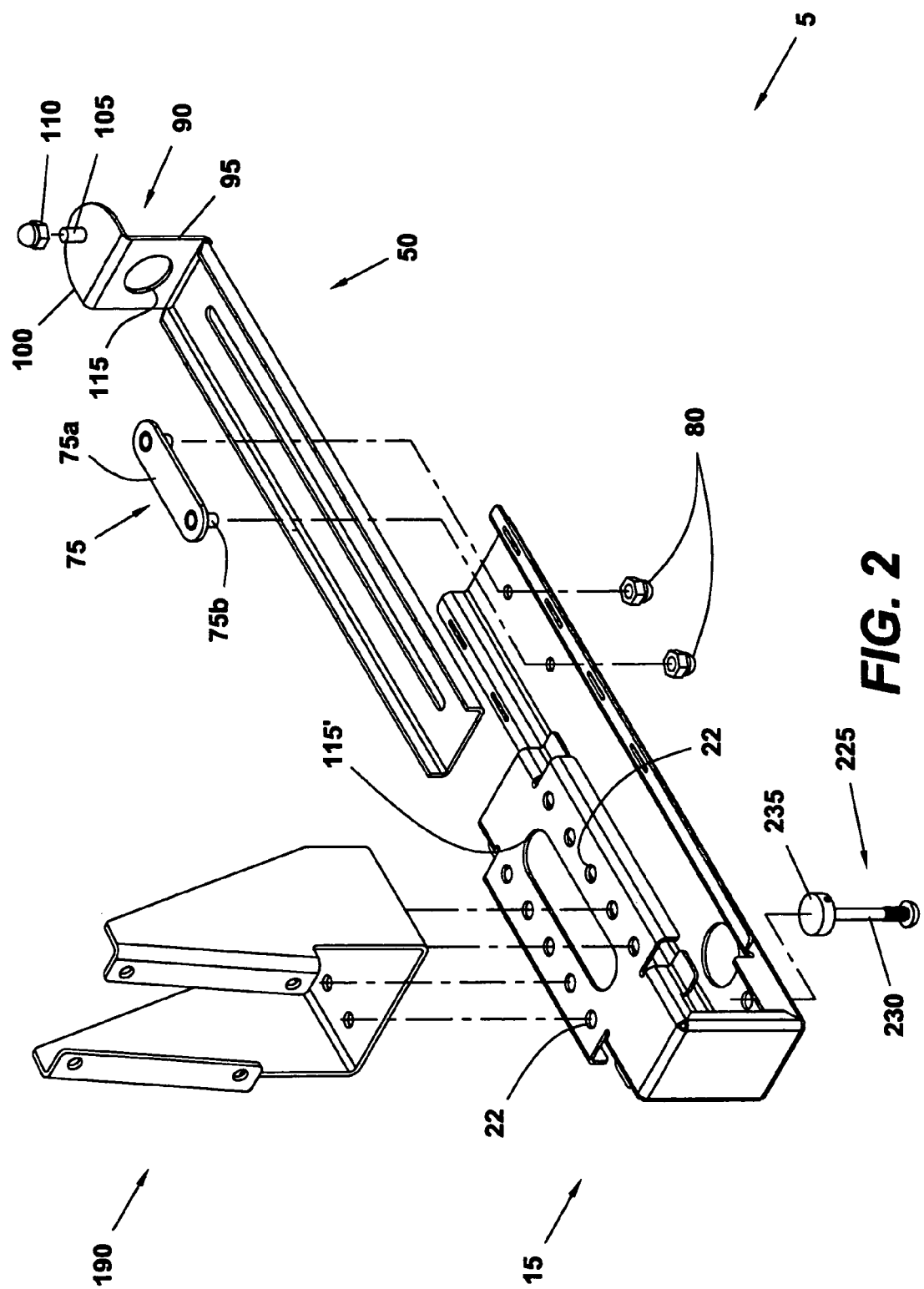
FIG. 2 is an assembly view of the adjustable bracket assembly of FIG. 1.

As can be observed in FIGS. 1-2, the adjustable bracket assembly 5 includes a front bracket member 15 and a rear bracket member 50, arranged in a sliding relationship. In this particular embodiment, a portion of the front bracket member 15 is designed to slidably receive a portion of the rear bracket member 50. Alternatively, the rear bracket member 50 may be designed to slidably receive a portion of the front bracket member 15.

The adjustable bracket assembly 5 also includes an electronic display mounting bracket, which is designed to attach to both the front bracket member 15 and to the electronic display device 10. Although one particular electronic display mounting bracket 170 is shown in FIGS. 2 and 7-9, it should be understood that various embodiments of an electronic display mounting bracket (see FIGS. 5-7) may be used in the present invention, depending on the desired position of the electronic display with respect to the shelf to which the display is installed.

Figure 3:
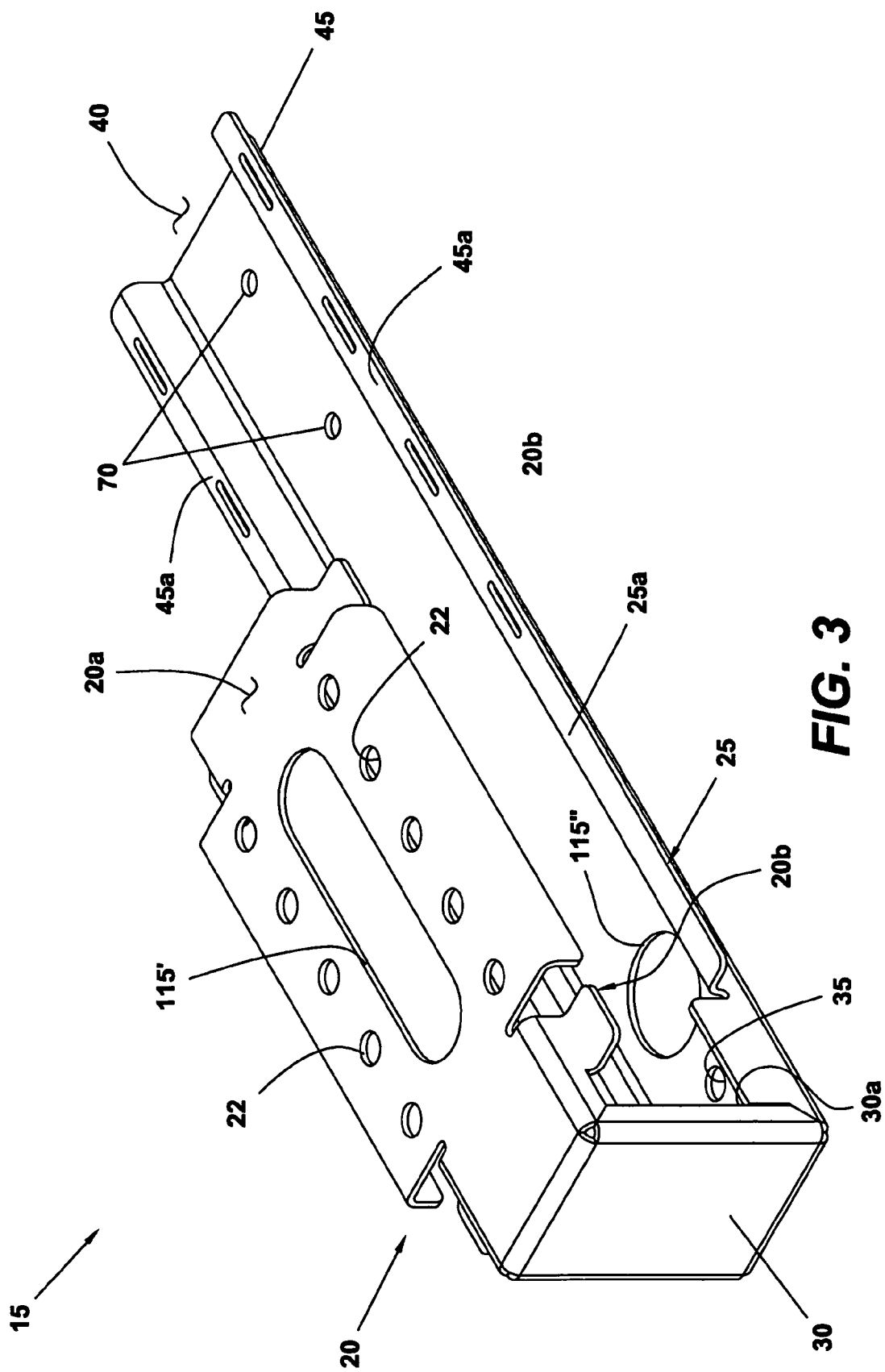
FIG. 3 is an enlarged view of a front bracket member of the adjustable bracket assembly shown in FIG. 1.
Figure 9:
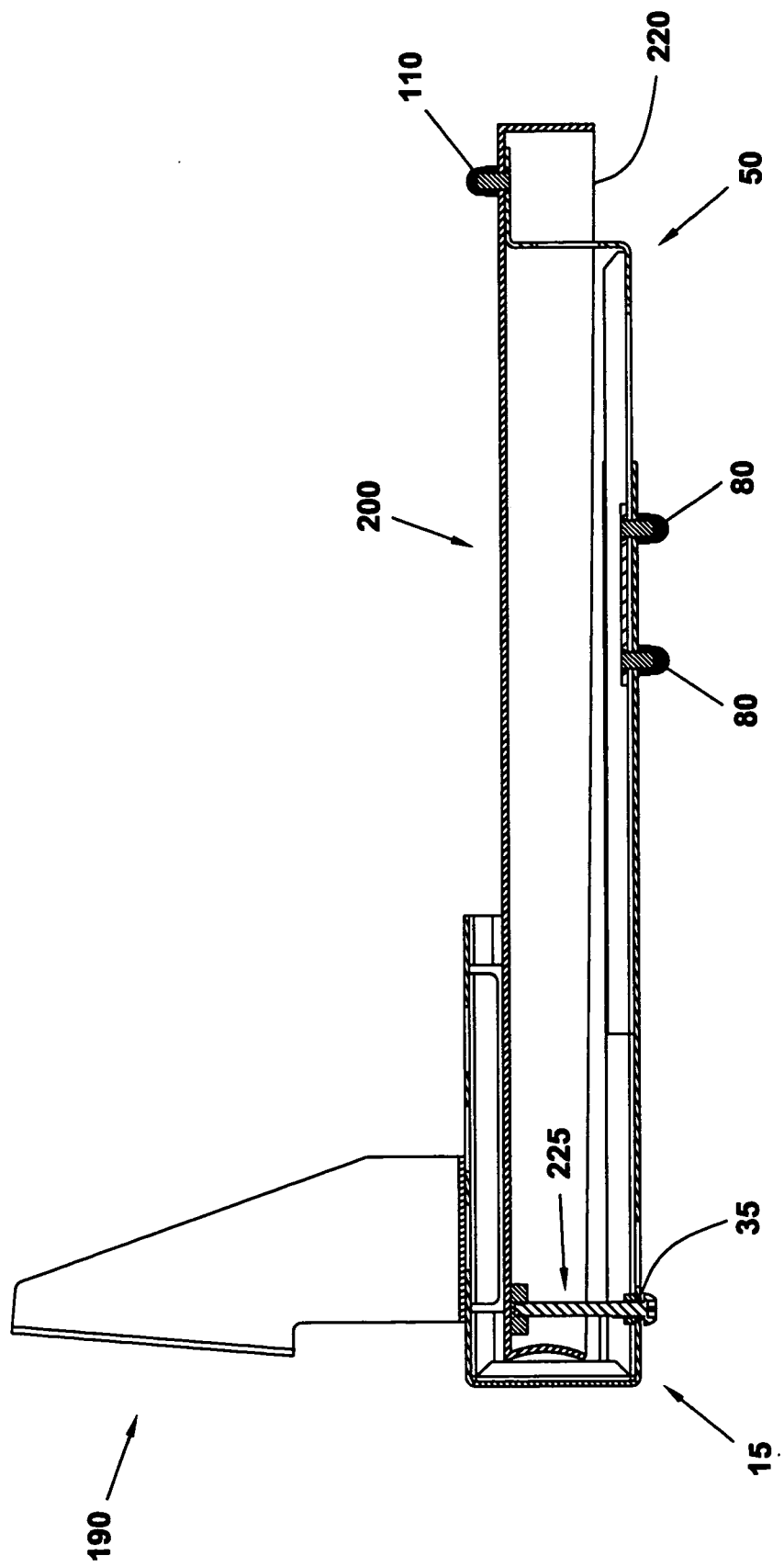
FIG. 9 is a side view, in cross-section, of the adjustable bracket assembly and shelf arrangement of FIG. 8.

As best shown in FIGS. 2-3 and 9, one end of the front bracket member 15 is preferably substantially C-shaped. The C-shape of the front bracket member 15 is formed by substantially horizontally oriented upper and lower legs 20, 25 that are connected at a distal end thereof by a substantially vertically oriented front leg 30. The C-shape allows the front bracket member 15 to trap a portion of a shelf 200 to which it is installed (see FIGS. 8-9). The length of the upper and lower legs 20, 25 of the front bracket member 15 may vary, depending on the particular installation. However, the upper leg 20 will typically be shorter than the lower leg 25 to provide for usable shelf space behind an electronic display device once it is mounted to the shelf.

The upper leg 20 of the front bracket member 15 is also preferably provided with a means for attaching an electronic display mounting bracket. In the particular embodiment of the front bracket member 15 shown, the upper leg 20 is provided with mounting holes 22, each adapted to receive a threaded fastener. The holes 22 may be threaded, or may have a threaded insert installed thereto. Preferably, a series of mounting holes 22 are provided to allow for flexibility in locating the electronic display. Obviously, various other fastening means could also be used to acceptably attach an electronic display mounting bracket to the front bracket member 15. Such means would be well known to those skilled in the art and, therefore, will not be discussed in detail herein.

In the particular embodiment of the front bracket member 15 shown, the lower leg 25 is designed to form an optional channel 40 for receiving and guiding a portion of a lower leg 55 (see FIG. 4) of the rear bracket member 50. In this embodiment, the channel 40 is formed by bending a portion of the lower leg 25 upward to form shallow sides 45 that run along the length of the lower leg. Of course, it should be understood that the use of a channel is optional, and is not essential to the present invention. Additionally, if a channel or similar structure is used, it may be formed in a variety of other ways that would be known to one skilled in the art. The upwardly extending sides 45 may further be turned outward, thereby forming a substantially flat top surface 45*a*. The top surface 45*a* may be provided to engage a printer mounting bracket 250 discussed in more detail below.

Figure 4:
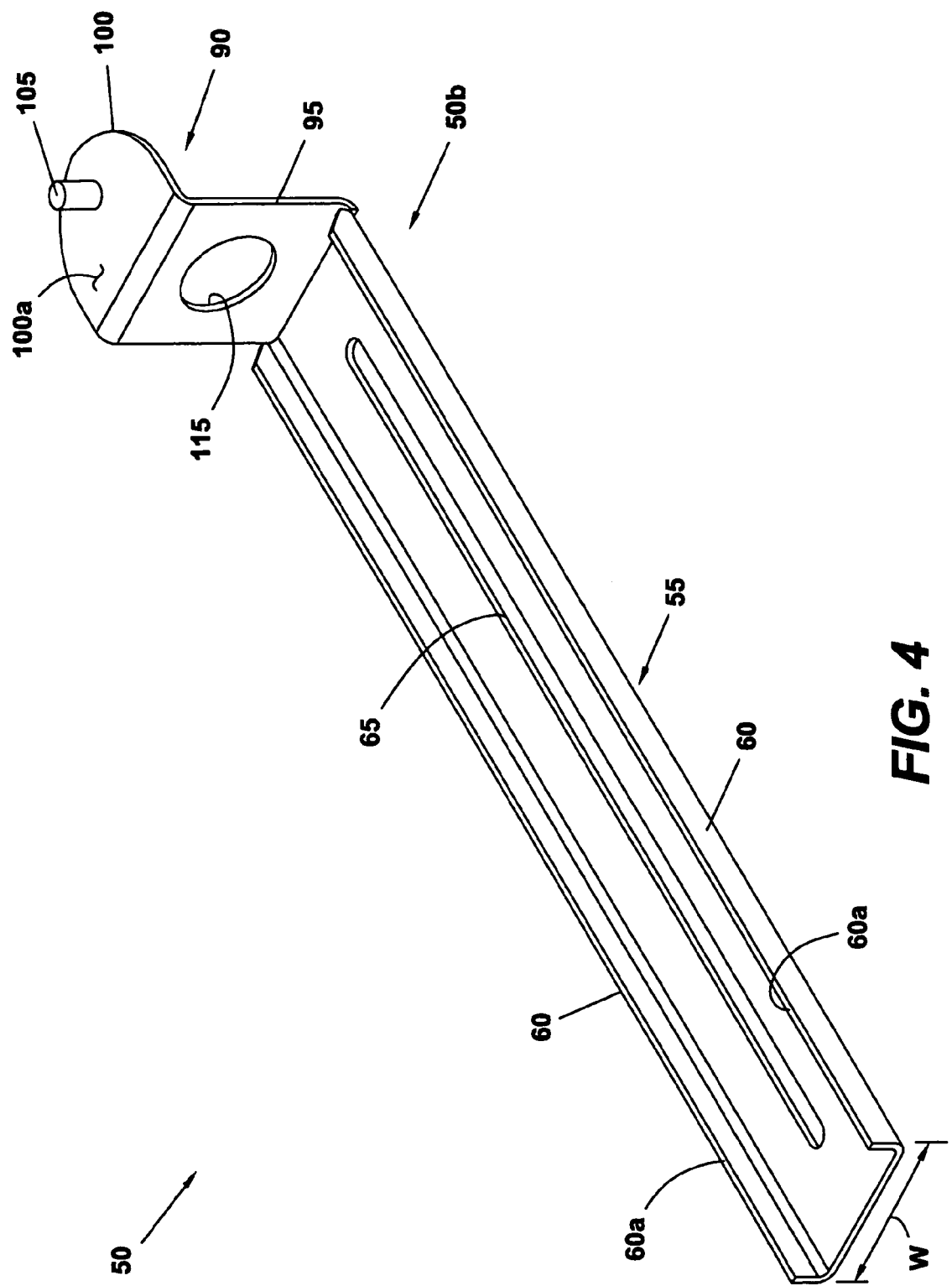
FIG. 4 is an enlarged view of a rear bracket member of the adjustable bracket assembly shown in FIG. 1.

The rear bracket member 50 can be best observed by reference to FIG. 4. This particular embodiment of the rear bracket member 50 has a lower leg 55 of some length that is designed to slidably engage the lower leg 25 of the front bracket member 15. More particularly, in the particular embodiment shown, the lower leg 55 is of a width that allows it to be slidably inserted into the channel 40 formed in the lower leg 25 of the front bracket member 15. The outside width W of the lower leg 55 is preferably such that it allows the rear bracket member 50 to be slidably displaced within the channel 40 without allowing for an undue amount of lateral movement. The lower leg 55 of the rear bracket member 50 may also have upturned sides 60 to add stability and to assist with control of its sliding movement within the channel 40. As with the lower leg 25 of the front bracket member 15, the upturned sides 60 of the lower leg 55 are optional and not essential to the present invention. When the lower leg 55 of the rear bracket member 50 is provided with upturned sides 60, the height of the sides may be selected so that the top surface 60*a* thereof coincides with the top surface 45*a* of the upturned sides 45 of the lower leg 25 of the front bracket member 15 when the two bracket members are properly assembled (see FIG. 9).

The rear bracket member 50 preferably has a connector at its distal end 50*b*. In this particular embodiment, a substantially L-shaped connector 90 is provided in the form of a bend having a vertically oriented rear leg 95 connected at a lower end to the lower leg 55 of the rear bracket member 15, and a substantially horizontally oriented upper leg 100 that is connected to the opposite end of the rear leg. It should be realized that it is also possible to form the connector 90 from other components that may, or may not, be an integral part of the rear bracket member 50.

The connector 90 of the rear bracket member 50 is provided to engage a rear portion 200*b* of the shelf 200 to which it is mounted. More specifically, a top surface 100*a* of the connector's horizontally oriented upper leg 100 preferably resides against the bottom surface 205*b* of the top wall 205 of the shelf 200 when the adjustable bracket assembly 5 is installed thereto (see FIGS. 8-9). Therefore, the top surface 100*a* of the connector's horizontally oriented upper leg 100 is preferably, but not necessarily, on substantially the same plane as the bottom surface 205*b* of the top wall 205 of the shelf 200. In this manner, the top wall 205 of the shelf 200 is trapped between the bottom surface 20*b* of the upper leg 20 of the front bracket member 15 and the top surface 100*a* of the connector 90.

Figure 5:
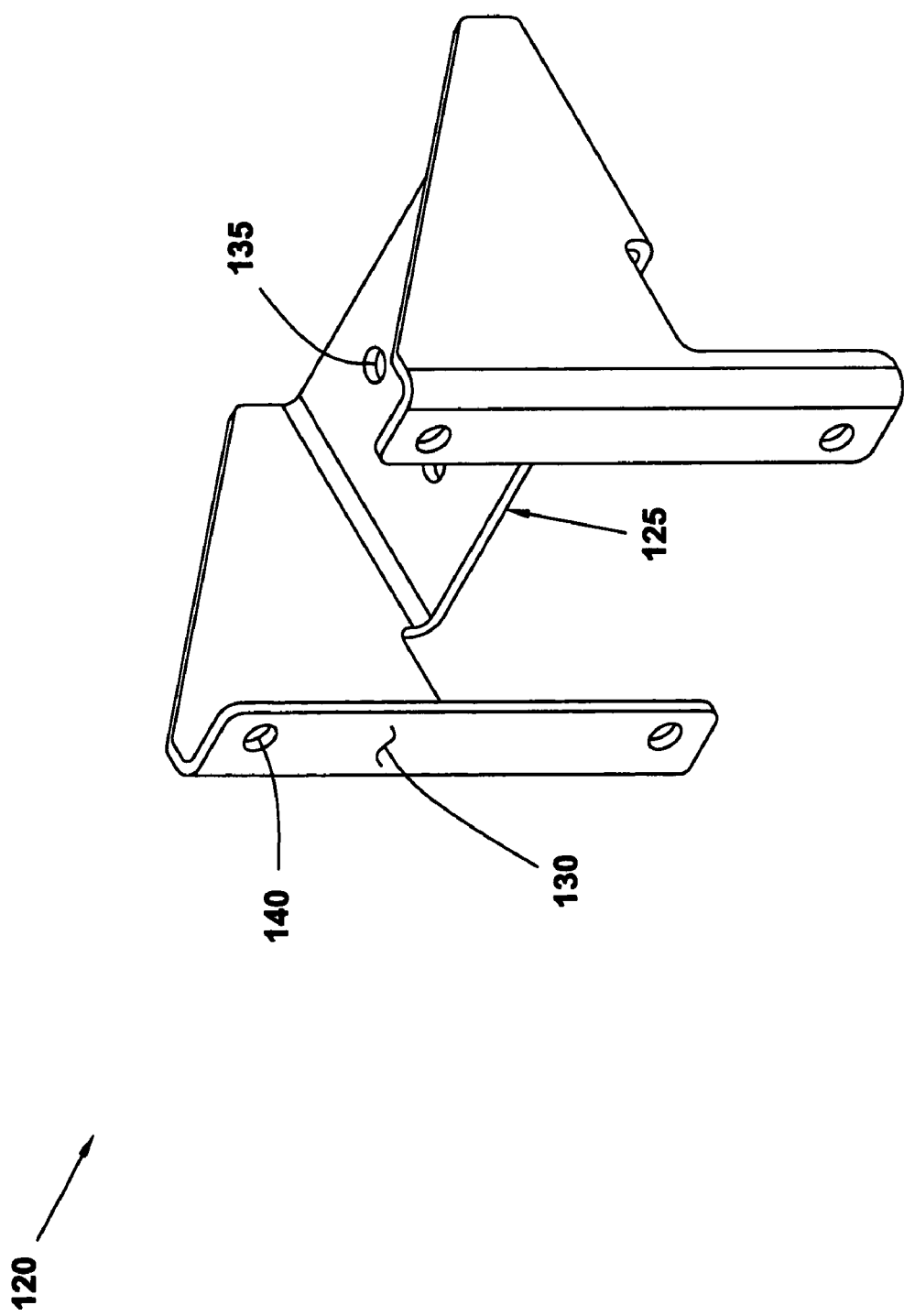
FIG. 5 is a perspective view of one embodiment of an electronic display mounting bracket that can be used to mount an electronic display device to the adjustable bracket assembly of FIG. 1.
Figure 6:
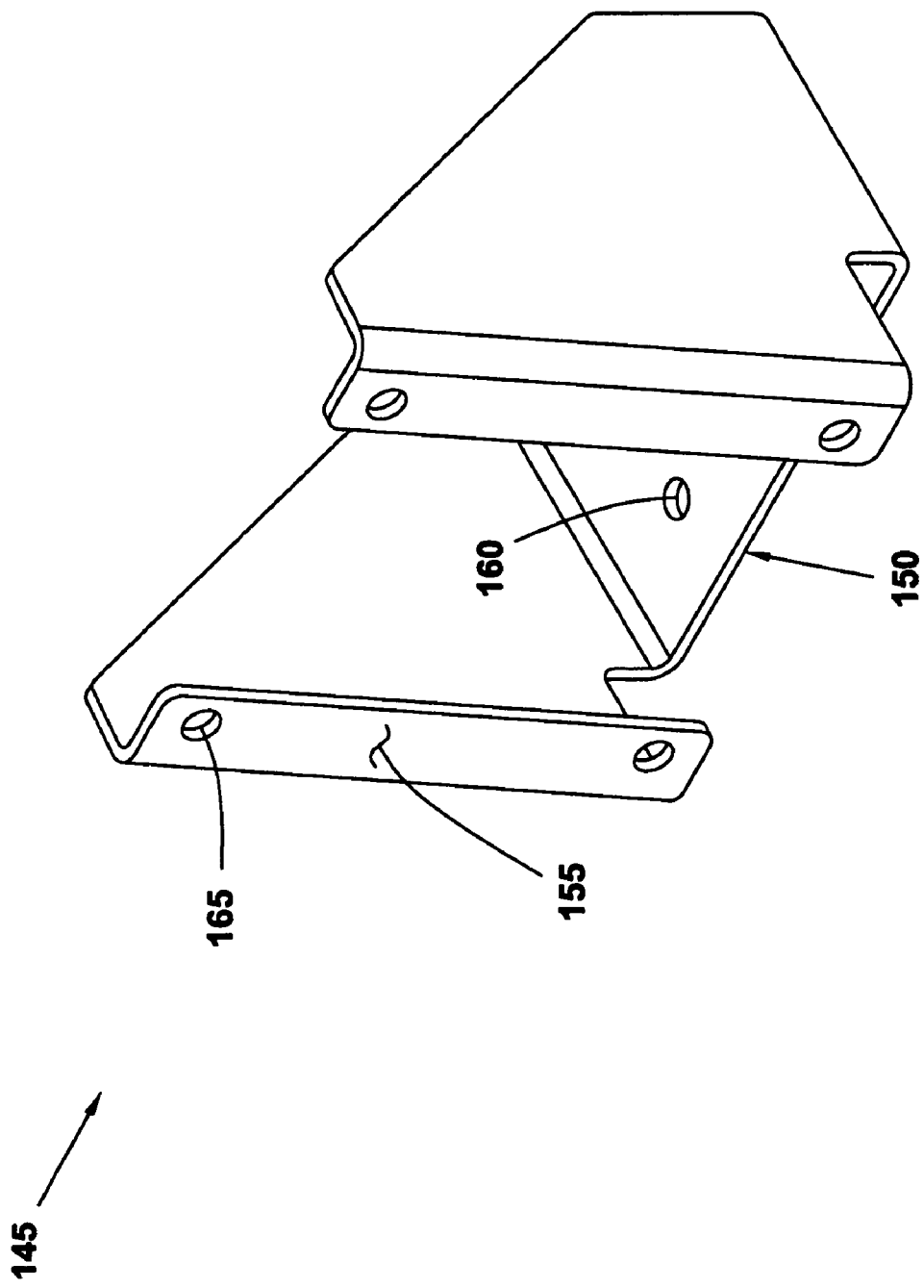
FIG. 6 is a perspective view of another embodiment of an electronic display mounting bracket that can be used to mount an electronic display device to the adjustable bracket assembly of FIG. 1.
Figure 7:
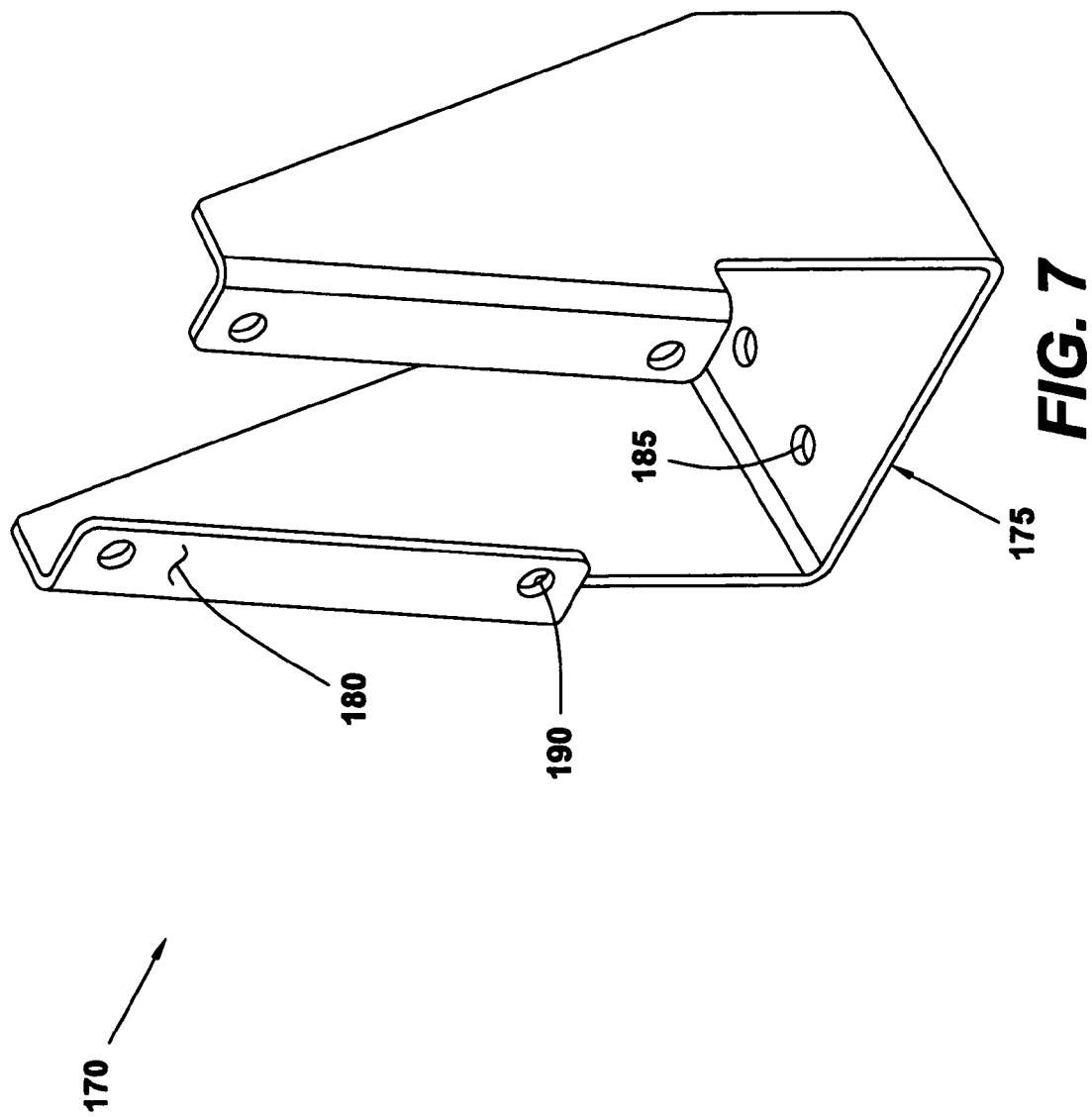
FIG. 7 is a perspective view of yet another embodiment of an electronic display mounting bracket that can be used to mount an electronic display device to the adjustable bracket assembly of FIG. 1.
Figure 8:
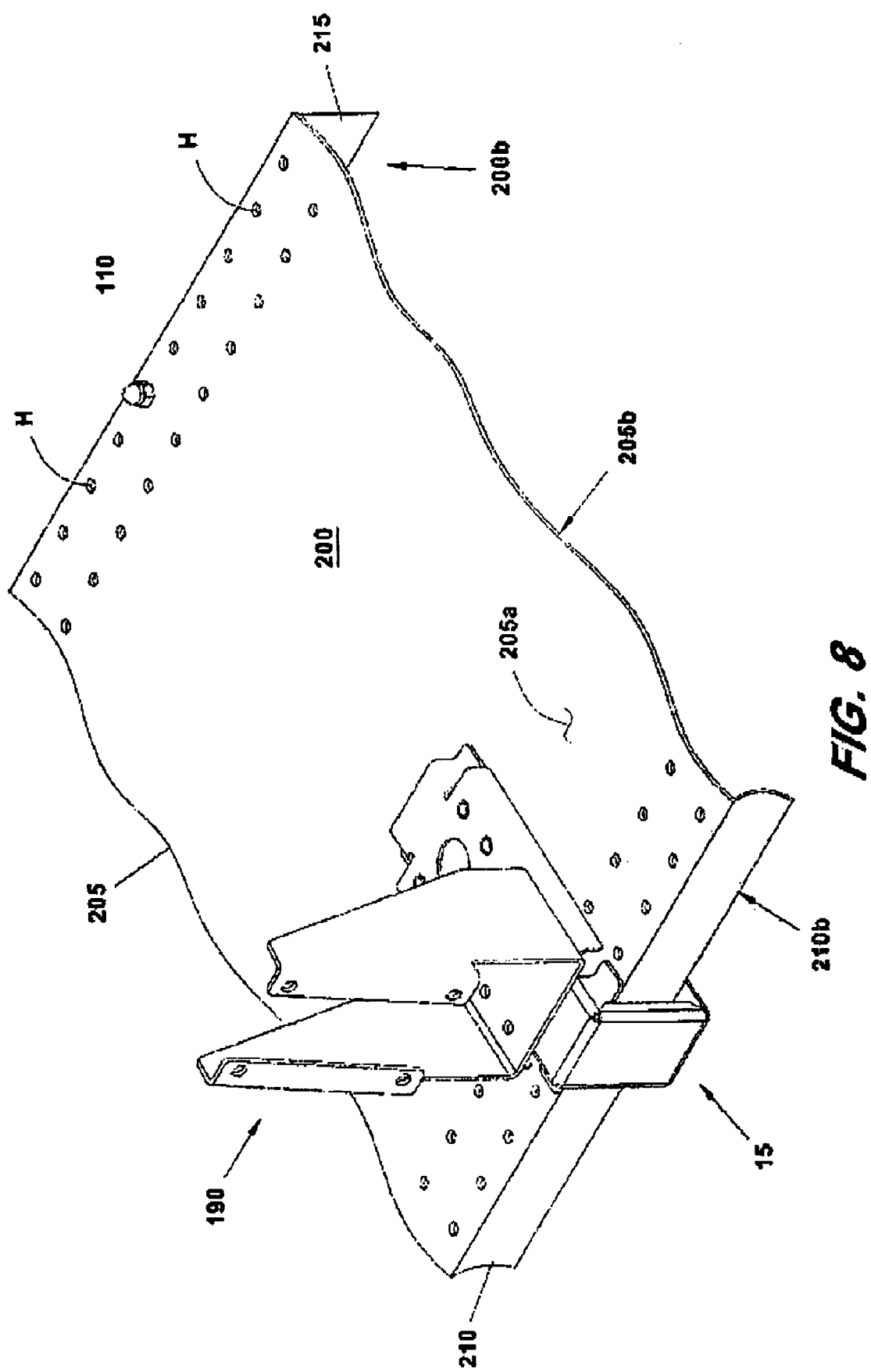
FIG. 8 illustrates, in partial cutaway, the adjustable bracket assembly of FIG. 1 mounted to a shelf.

An electronic display mounting bracket 170 is also shown to be included with the adjustable bracket assembly 5. The electronic display mounting bracket 170 is provided to attach an electronic display device (see 10 of FIG. 1, for example) to the front bracket member 15. Several different embodiments of an electronic display mounting bracket 120, 145, 170 are illustrated in FIGS. 5-7, respectively. Each of the electronic display mounting brackets 120, 145, 190 is designed to locate an electronic display device, such as the electronic display device 10, at a different vertical position with respect to a shelf. For example, the electronic display mounting bracket 120 shown in FIG. 5 is designed to center the electronic display device 10 at approximately the vertical midline of the shelf 200. The electronic display mounting bracket 120 is provided with a bracket mounting face 125 for attaching the bracket to the upper leg 20 of the front bracket member 15, and a display mounting face 130 for attaching the bracket to the electronic display device 10. Each of the bracket mounting face 125 and the display mounting face 130 are provided with holes 135, 140 therethrough for attachment via threaded fasteners to the front bracket member 15 and the electronic display device 10, respectively. Other attachments means could obviously also be employed. The display mounting face 130 is shown to be substantially vertically oriented in FIG. 5, but other angles thereof are also possible.

An alternate embodiment of an electronic display mounting bracket 145 is depicted in FIG. 6. In a similar manner to the electronic display mounting bracket 120 of FIG. 5, the electronic display mounting bracket 145 is provided with a bracket mounting face 150 for attaching the bracket to the upper leg 20 of the front bracket member 15, and a display mounting face 155 for attaching the bracket to the electronic display device 10. Each of the bracket mounting face 150 and the display mounting face 155 are provided with holes 160, 165 therethrough for attachment via threaded fasteners to the front bracket member 15 and the electronic display device 10, respectively. Other attachment means could obviously also be employed. This embodiment of the electronic display mounting bracket 145 is designed to locate at least a majority of the electronic display device 10 at a position that is slightly above the shelf 200. For example, a bottom edge of the electronic display device 10 may be even with, or slightly above or below, the top surface 205*a* of the top wall 205 of the shelf 200. In FIG. 6, the display mounting face 155 is shown to be oriented at approximately a 15° angle with respect to vertical, but other angles are also possible.

The embodiment of the electronic display mounting bracket 170 shown in FIGS. 1-2 and 8-9 is depicted in FIG. 7. In a similar manner to the electronic display mounting brackets 120, 145 of FIGS. 5 and 6, the electronic display mounting bracket 170 is provided with a bracket mounting face 175 for attaching the bracket to the upper leg 20 of the front bracket member 15, and a display mounting face 180 for attaching the bracket to the electronic display device 10. Each of a bracket mounting face 175 and a display mounting face 180 are provided with holes 185, 190 therethrough for attachment via threaded fasteners to the front bracket member 15 and the electronic display device 10, respectively. Other attachment means could obviously also be employed. In this embodiment, the electronic display mounting bracket 170 is designed to locate the electronic display device 10 at a position that is fully above the shelf 200. For example, the electronic display mounting bracket 170 may be used to locate the electronic display device 10 at a position that is the approximate midpoint between the shelf 200 to which it is attached and another shelf residing immediately thereabove. In FIG. 7, the display mounting face 180 is shown to be oriented at approximately a 15° angle with respect to vertical, but other angles are also possible.

It is to be understood that the electronic display mounting brackets 120, 145, 170 illustrated in FIGS. 5-7 are provided for purposes of illustration and not limitation. For example, an electronic display mounting bracket may be designed to locate an electronic display device at virtually any desired position with respect to the shelf. Similarly, the angle of the display mounting face can be adjusted as necessary to produce a desired viewing angle.

The front bracket member 15, rear bracket member 50, and electronic display mounting brackets 120, 145, 170 are depicted herein to be constructed from a metallic material that has been blanked and formed using one or more forming/stamping dies. This form of construction allows for efficient and inexpensive creation of the various adjustable bracket assembly components, and imparts good strength thereto. However, it should be realized that nothing herein is intended to limit any of the components 15, 50, 120, 145, 170 to such a construction. It is contemplated that non-metallic materials and their associated manufacturing techniques may be used to form the components. For example, the components may be molded from one or more plastic materials. It is also within the scope of the present invention to manufacture the individual components from a metallic material via welding or other non-stamping assembly techniques.

In order to assemble and secure the rear bracket member 50 to the front bracket member 15 and to allow the slidable adjustment thereof, a slot is preferably provided in at least one of their lower legs 25, 55. In the embodiment shown, a slot 65 is located in the lower leg 55 of the rear bracket member 50, although such a slot could also be located in the front bracket member 15, or in both bracket members. In the particular embodiment of the adjustable bracket assembly 5 described and shown, a pair of apertures 70 are located in the lower leg 25 of the front bracket member 15 to align with the slot 65 in the rear bracket member 50 when the bracket members are properly assembled. The combination of the slot 65 and the apertures 70 allows fasteners to be passed through the assembled bracket members 15, 50. The fasteners may act as a guide with respect to sliding movement of the bracket members 15, 50. The fasteners are also used to fix the location of the rear bracket member 50 to the front bracket member 15, thereby allowing for an adjustment of the overall length of the adjustable bracket assembly 5 and its use with shelving of varying depth.

It should be realized that a number of removable or releasable fasteners may be used to secure the bracket members 15, 50, each to the other. However, as shown in FIGS. 1-2 and FIG. 9, a stud plate 75 may be employed for this purpose. As shown, the stud plate includes a flat keeper plate 75a to which is affixed a pair of threaded studs 75b. The size and spacing of the threaded studs 75b allows for their passage through the slot 65 and the apertures 70 once the bracket members 15, 50 are assembled. A pair of like threaded nuts 80 may then be removably affixed to the studs 75b in order to secure the position of the bracket members 15, 50 each to the other.

In order to better comprehend installation of the adjustable bracket assembly 5 of the present invention to a shelf, it is necessary to understand the typical construction thereof. As can be observed by reference to FIGS. 8-9, a typical shelf 200 has a flat top wall 205, on which products may be displayed, as well as front 210, rear 215, and side walls 220. Thus, such a shelf 200 will generally take the form of a bottomless shallow box of some length, depth and height. Obviously, such shelves may also have somewhat different designs, and the illustrated example is not to be construed as limiting the adjustable bracket assembly of the present invention to use therewith.

When used with such a shelf 200, a bottom surface 20b of the front bracket member's top leg 20 will preferably contact a top surface 205a of the shelf 200. When installed thereto, a portion of the lower leg 25 may, or may not, contact a bottom surface 210b of the front wall 210 of the shelf 200. Similarly, a portion of the front leg 30 may, or may not, contact the front wall 210 of the shelf 200.

As can be best observed in FIG. 9, in order to securely but releasably affix the front bracket member 15 portion of the adjustable bracket assembly 5 to the shelf 200, it is preferred that one or more adjustable clamping devices be employed. The illustrated embodiment of the adjustable clamping device 225 preferably employs a bolt 230 having a partially threaded body. The bolt 230 has a head attached at the threaded end of the body. At the other (unthreaded) end of the body resides a clamping pad 235, which is provided to contact the bottom surface 205b of the top wall 205 of the shelf 200. The bolt passes through a hole 35 in the lower leg 25 of the front bracket member 15. The hole 35 is either threaded or provided with a threaded insert to engage the threads on the bolt. Consequently, after installation of the adjustable bracket assembly 5 to a shelf, proper rotation of the bolt will cause the clamping pad 235 to come into contact with the bottom surface 205b of the top wall 205 of the shelf and to secure the front bracket member 15 thereto. Providing threads on only a portion of the bolt body allows the clamping device 225 to be fully released more quickly than would be possible if the bolt body were fully threaded. However, it should be realized that a fully threaded bolt could also be used. Similarly, it is possible to employ other types of clamping devices for releasably securing the front bracket member 15 to the shelf.

The rear bracket member 50 portion of the adjustable bracket assembly 5 may be affixed to the shelf 200 by passing a fastener through both a hole (not shown) in the upper leg 100 of the connector and one of the holes H inherently present along the rear 205b of the top wall 205 of the shelf 200. A separate fastener element may be employed for this purpose. However, in order to facilitate attachment of the connector 90 to the shelf 200, it is preferred that a threaded stud 105 reside on the connector 90 and be sized and oriented to allow passage thereof through one of the holes H along the rear of the shelf upon installation of the adjustable bracket assembly 5 thereto. Subsequently, a like-threaded nut 110 can be removably installed to the threaded stud 105 to secure the rear bracket member 50 to the shelf 200.

It has been found that the rear portion of a typical shelf tends to be stronger and more stable than the front portion, due largely to its proximity to the attachment point of the shelf with its associated framing or support members. As can be best observed by reference to FIGS. 8-9, the assembled bracket assembly 5 attaches to both the front and rear of the shelf. Because the bracket assembly 5 is stable once assembled and extends along substantially the entire depth of a shelf, the bracket assembly typically acts to strengthen those shelves that may be unstable due to being manufactured from thin or otherwise weak materials. This strengthening can be particularly useful when the electronic display device of interest employs a touch screen, as the mounting of such an electronic display device to an unstable shelf could result in an undesirable shaking or bouncing of the shelf (and the display device) during interaction between the touch screen and a user.

A wire routing aperture 115 is preferably provided through the vertical rear leg 95 of the connector 90. The wire routing aperture 115 allows cables and/or other associated wiring to be passed through the connector 90 at the distal end 50b of the rear bracket member 50. Additional wire routing apertures 115', 115" may also be located in the upper and/or lower legs 20, 25 of the front bracket member to assist in the routing of cables and/or other associated wiring. In this manner, the cables and/or other associated wiring may be routed to the electronic display device 10 from a position underneath the shelf 200—thereby keeping the cables and/or other associated wiring out of sight and from taking up shelf space that can instead be used to display product.

Figure 10:
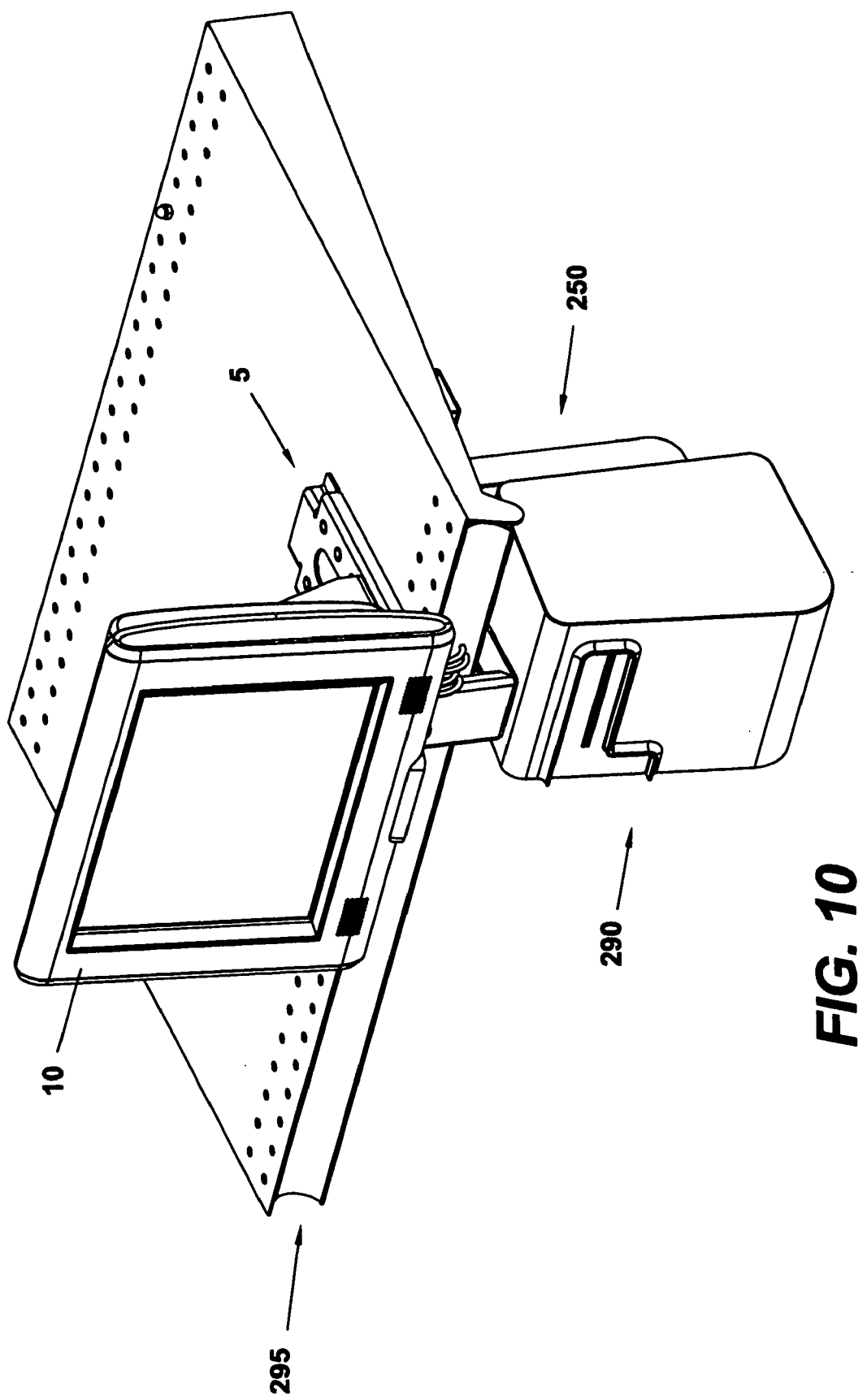
FIG. 10 is a perspective view of a printer associated with an adjustable bracket assembly of the present invention.

As illustrated in FIG. 10, a printer 290 may also be attached to a shelf 295 using an adjustable bracket assembly of the present invention. In FIG. 10, the adjustable bracket assembly 5 shown in FIGS. 1-3 and 8-9, is affixed to the shelf 295 and again supports the electronic display device 10. The printer 290 is suspended beneath the shelf 300. The printer 290 can be used, for example, to print coupons, recipes, nutritional information, or any of various other information that is displayed or accessed via the electronic display device 10.

Figure 11B:
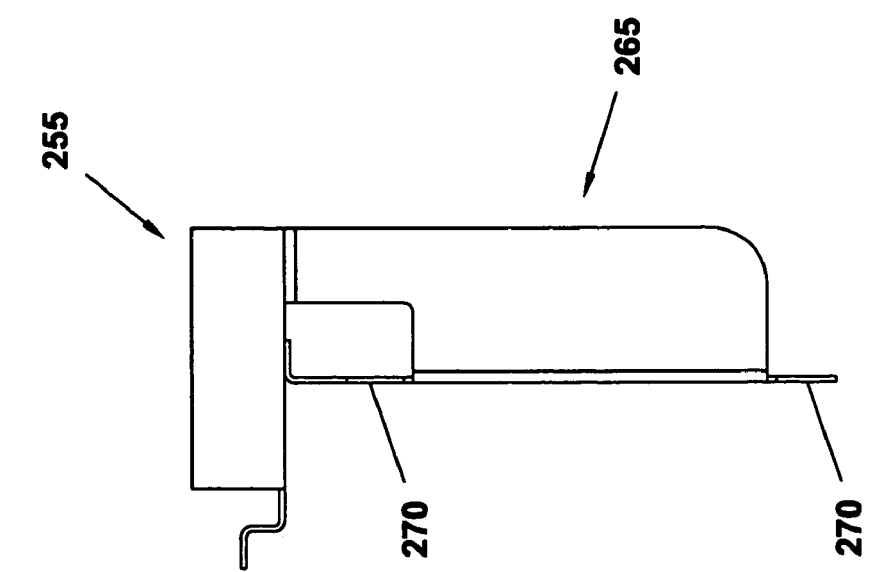
FIGS. 11a and 11b show a front view and a side view, respectively, of a printer mounting bracket that can be used to attach a printer to an adjustable bracket assembly of the present invention.
Figure 11A:
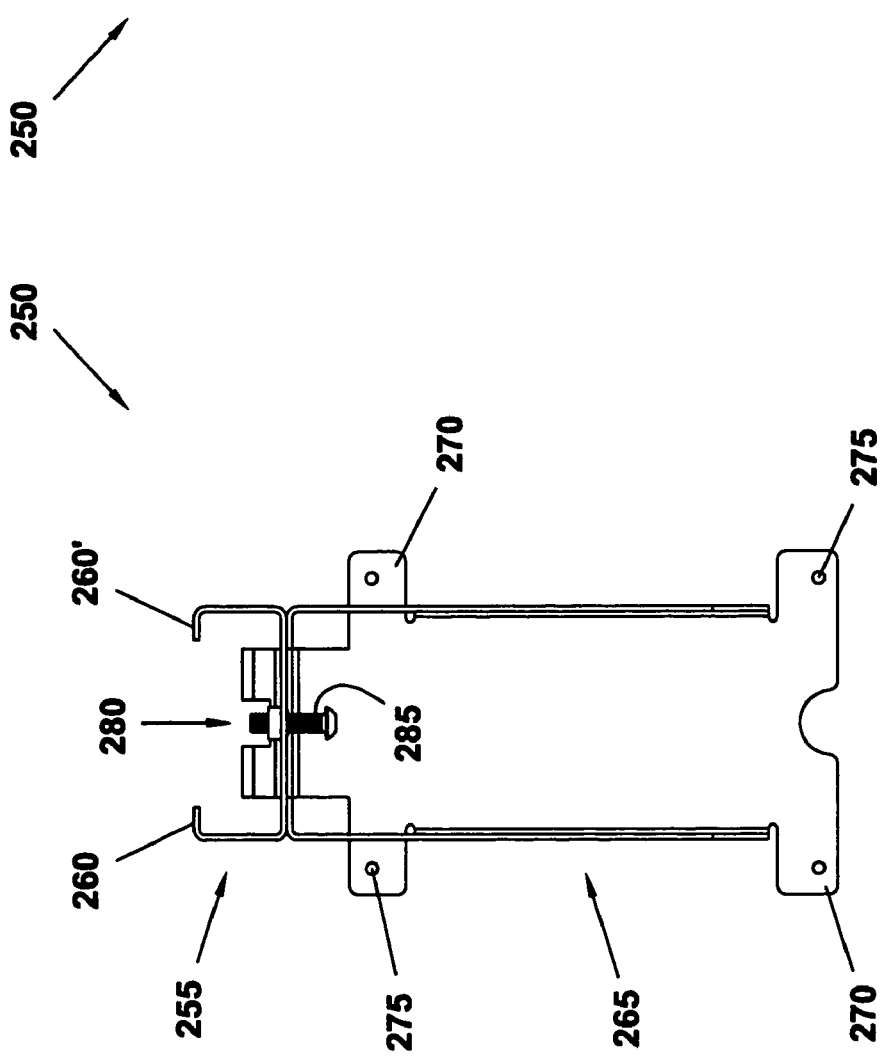

A printer mounting bracket may be included with the adjustable bracket assembly 5 in order to facilitate attachment of the printer 290 thereto. One embodiment of a printer mounting bracket 250 can be observed in detail in FIG. 11. As can be seen, this particular printer mounting bracket 250 consists of a slide bracket member 255 and a printer mounting member 265. Preferably, the slide bracket member 255 and a printer mounting member 265 are welded together, but could also be affixed by other means. Alternatively, the slide bracket member 255 and printer mounting member 265 may be of unitary construction, such that welding and other types of joining are not necessary.

The slide bracket member 255 of the printer mounting bracket 250 is designed to engage the lower leg 25 of the adjustable bracket assembly's 5 front bracket member 15. More specifically, the slide bracket member 255 of this embodiment of the printer mounting bracket 250 is substantially C-shaped, with its open side directed upward. Two legs 260, 260' extend substantially horizontally inward a short distance along the open side of the slide bracket member 255. These legs 260, 260' are designed to engage the top surface 45a of the upturned sides 45 of the front bracket member 15 in such a manner that the printer mounting bracket 250 can be slidably displaced along the length of the front bracket member while being simultaneously supported in a hanging position therefrom.

This particular embodiment of the printer mounting bracket 250 is designed for attachment directly to the rear of the printer 290. More specifically, the printer mounting member 265 of the printer mounting bracket 250 extends downward from the slide bracket member 255 in order to mate with the rear of the printer 290. The printer mounting member 265 is provided with several printer mounting tabs 270 that are located to align with threaded holes in the rear of the printer 290. A fastener (not shown) is then passed through a hole 275 in each mounting tab 270 and into threaded holes in the printer 290.

It is also preferred that a position fixing device 280 be provided to secure the position of the printer bracket 250 (and printer) along the length of the front bracket member 15. In this particular embodiment, the position fixing device 280 is simply a threaded fastener 285 that passes upward through a threaded hole or other like-threaded element located in/on the printer mounting bracket 250. Once the desired position of the printer mounting bracket 250 (and/or printer) is determined, the fastener 285 is threaded upward until its end makes contact with the lower leg 25 of the front bracket member 15, thereby securing the location of the printer mounting bracket.

The adjustable bracket assembly 5 can also be used with printers that are not designed for such direct mounting techniques. For example, more traditional styles of printers may also be employed. In such a case, it is preferred that the printer reside in a printer housing, which housing can then be attached to the printer mounting bracket 250, or a similar bracket. Such a housing may be attached to the printer mounting bracket 250, or a similar bracket, at its top or rear, for example.

Figure 12:
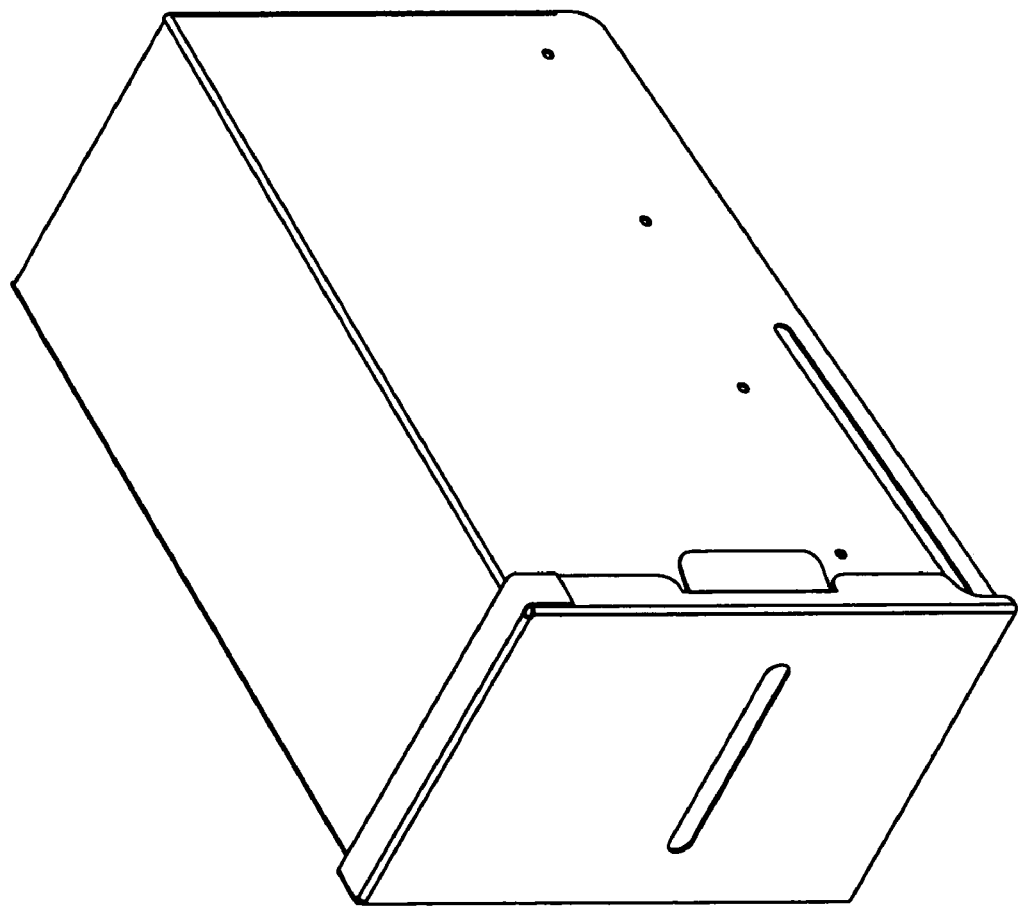
FIG. 12 illustrates one embodiment of an assembled printer housing that can be used with an adjustable bracket assembly of the present invention.
Figure 14:
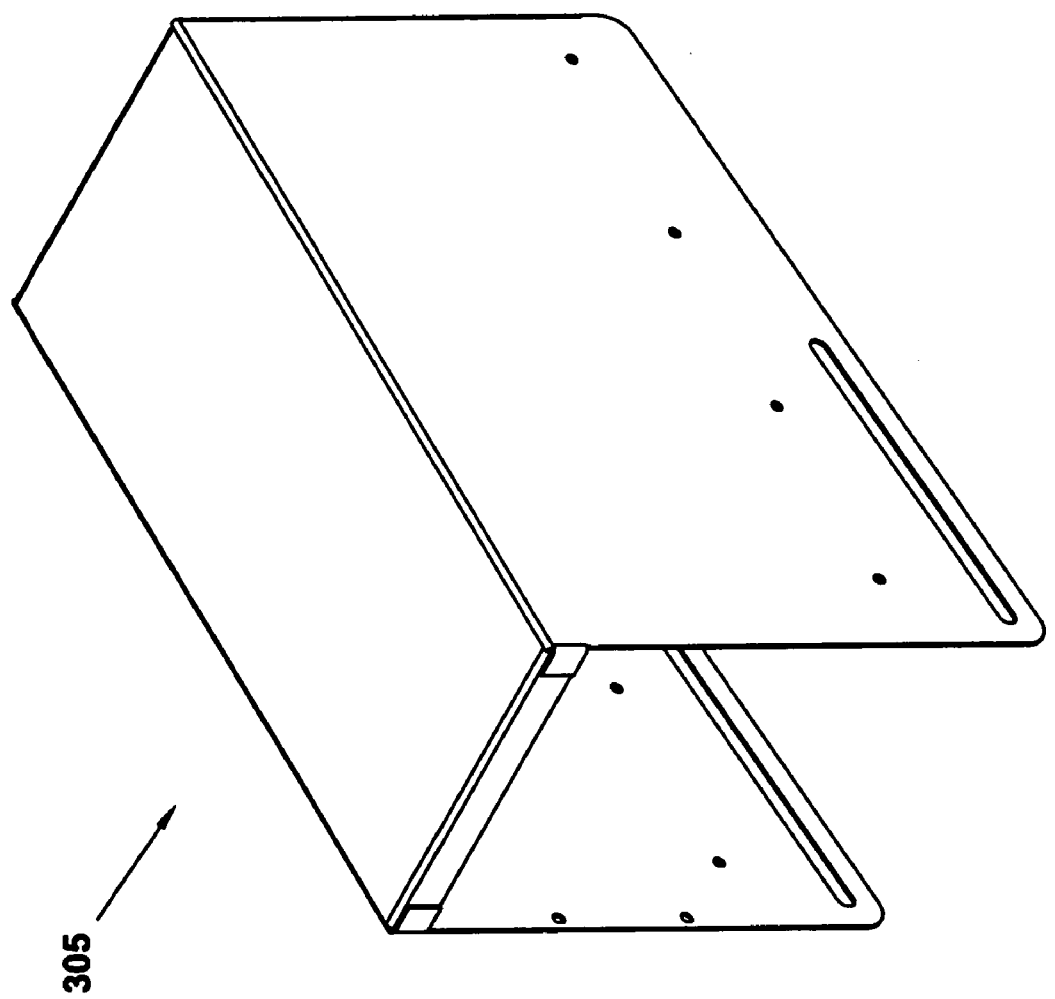
FIG. 14 is an enlarged view of an enclosure portion of the printer housing of FIGS. 12-13.
Figure 15:
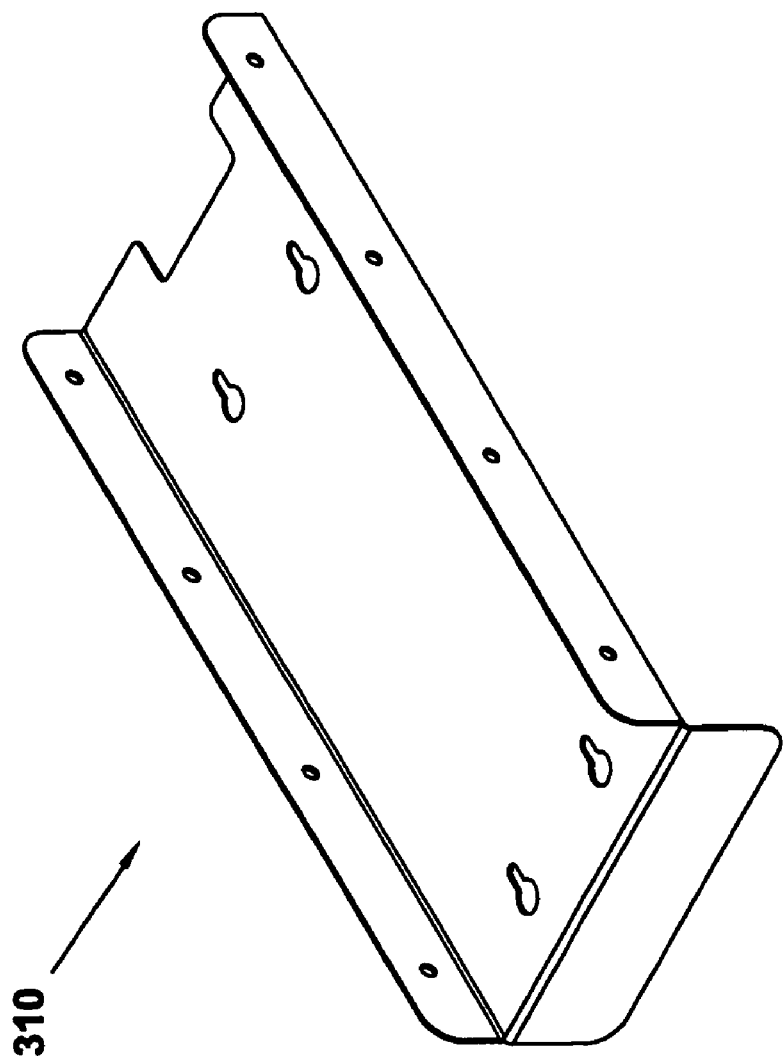
FIG. 15 is an enlarged view of a base portion of the printer housing of FIGS. 12-13.
Figure 16:
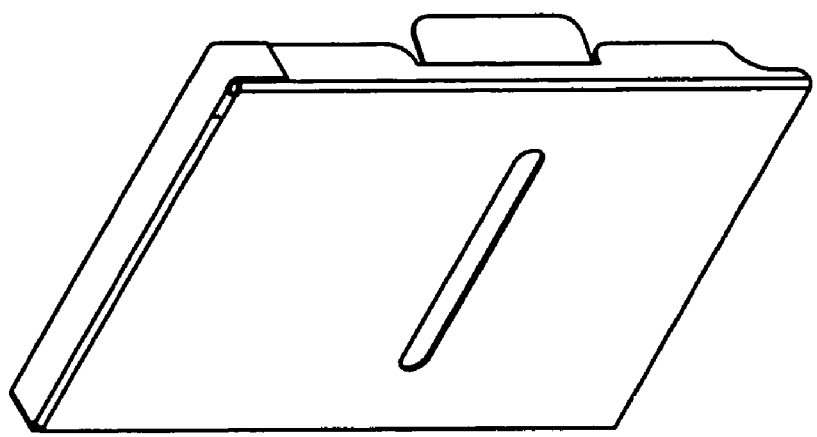
FIG. 16 is an enlarged view of a front cover portion of the printer housing of FIGS. 12-13.

An exemplary printer housing 300 suitable for such use can be observed in FIGS. 12-16. An assembled view of the housing 300 is shown in FIG. 12. FIG. 13 illustrates an unassembled view of the housing 300, which can be seen to be comprised of an enclosure 305 portion, a base 310 portion, and a front cover 315 portion. Each of the enclosure 305, base 310, and front cover 315 can be individually seen by reference to FIGS. 14, 15, and 16, respectively. In FIGS. 14-16, each of the enclosure 305, base 310, and front cover 315 are shown to be of stamped metallic construction, and designed to be assembled one to the other by means of fasteners. It should be realized, however, that other materials and techniques may be used to manufacture the individual components 305, 310, 315. For example, the components 305, 310, 315 may be injection molded from a plastic material. Additionally, two or more of the components 305, 310, 315 can be combined into a single component.

While certain embodiments of the present invention are described in detail above, the scope of the invention is not to be considered limited by such disclosure, and modifications are possible without departing from the spirit of the invention as evidenced by the following claims:

What is claimed is:

1. An adjustable bracket assembly for mounting an electronic display device to a substantially hollow shelf having a top wall with at least a front wall extending downwardly therefrom, comprising:

a slidable arrangement of a front bracket member and a rear bracket member, said front bracket member having a distal end adapted to surround a front portion of said shelf and said rear bracket member having a distal end comprising a substantially L-shaped connector that extends vertically upward to mate with a bottom surface of said top wall of said shelf, said connector including a means for attachment thereof to said shelf through at least one hole naturally present near a rear portion of said shelf; wherein means for attaching said distal end of said rear bracket member to said shelf through said hole comprises a fastener for passing through a portion of said substantially L-shaped connector and said at least one hole naturally present near a rear portion of said shelf;

an electronic display mounting bracket for attaching an electronic display device to a portion of said front bracket member; and a means for securing at least said front bracket member to said shelf once a slidably engaged arrangement of said front bracket member and said rear bracket member is located thereto;

wherein said slidable arrangement of said front bracket member and said rear bracket member allows said bracket assembly to accommodate shelves of varying width.

2. The adjustable bracket assembly of claim 1, wherein one or more of said front bracket member, said rear bracket member, and said electronic display mounting bracket are sheet metal formed.

3. The adjustable bracket assembly of claim 1, wherein one or more of said front bracket member, said rear bracket member, and said electronic display mounting bracket are of welded construction.

4. The adjustable bracket assembly of claim 1, wherein one or more of said front bracket member, said rear bracket member, and said electronic display mounting bracket are molded from a plastic material.

5. The adjustable bracket assembly of claim 1, wherein said distal end of said front bracket member is substantially C-shaped.

6. The adjustable bracket assembly of claim 1, further comprising a fastener for securing a portion of said front bracket member to a portion of said rear bracket member.

7. The adjustable bracket assembly of claim 1, further comprising a fastener adapted to pass upward through a lower portion of said front bracket member and to contact a top wall of said shelf.

8. The adjustable bracket assembly of claim 1, wherein said fastener is integral to said portion of said substantially L-shaped connector.

9. The adjustable bracket assembly of claim 1, further comprising a series of mounting holes in said front bracket member for attaching said electronic display mounting bracket at different locations with respect thereto.

10. The adjustable bracket assembly of claim 1, further comprising an aperture in one or both of said front bracket member and said rear bracket member for allowing wiring to be routed therethrough to said electronic display device.

11. An adjustable bracket assembly for mounting an electronic display device to a shelf in the shape of a substantially bottomless shallow box of some length, depth and height, comprising:
a front bracket member having a substantially C-shaped end for accepting a front portion of said shelf and an opposite end located beneath said shelf and adapted to slidably engage a corresponding end of a rear bracket member;
a rear bracket member having one end adapted to slidably engage a corresponding end of said front bracket member and at an opposite end a connector with a vertical rear leg oriented to extend upward into a hollow interior of said shelf, said vertical leg of a length such that a horizontally oriented upper leg that extends therefrom will mate with a similarly oriented bottom surface of a top wall of said shelf when said adjustable bracket assembly is installed thereto;
a means associated with said horizontally oriented upper leg for attaching said connector to said shelf via at least one hole naturally present along a rear portion thereof;
an electronic display mounting bracket for attaching an electronic display device to a portion of said front bracket member;
a means for securing said corresponding ends of said front bracket member and said rear bracket member to each other; and
a means for securing said front bracket member to said shelf once located thereto;

wherein the slidable engagement of said front bracket member and said rear bracket member allows said adjustable bracket assembly to be installed to shelves of varying width.

12. The adjustable bracket assembly of claim 11, wherein one or more of said front bracket member, said rear bracket member, and said electronic display mounting bracket are sheet metal formed.

13. The adjustable bracket assembly of claim 11, wherein one or more of said front bracket member, said rear bracket member, and said electronic display mounting bracket are of welded construction.

14. The adjustable bracket assembly of claim 11, wherein one or more of said front bracket member, said rear bracket member, and said electronic display mounting bracket are molded from a plastic material.

15. The adjustable bracket assembly of claim 11, wherein said means for attaching said connector to said shelf through at least one hole comprises a fastener for passing through said upper leg of said rear bracket member and said at least one hole naturally present near a rear portion of said shelf.

16. The adjustable bracket assembly of claim 15, wherein said fastener is integral to said upper leg of said rear bracket member.

17. The adjustable bracket assembly of claim 11, wherein said means for securing said corresponding ends of said front bracket member and said rear bracket member to each other is at least one threaded fastener.

18. The adjustable bracket assembly of claim 11, wherein said at least one threaded fastener passes through an elongated slot in one or both of said front bracket member and said rear bracket member.

19. The adjustable bracket assembly of claim 11, wherein a channel is provided on one or both of said front bracket member and said rear bracket member to assist with slidable engagement thereof.

20. The adjustable bracket assembly of claim 11, wherein said means for securing said front bracket member to said shelf comprises a fastener adapted to pass upward through a lower portion of said front bracket member and to contact said top wall of said shelf.

21. The adjustable bracket assembly of claim 11, further comprising a series of mounting holes in said front bracket member for attaching said electronic display mounting bracket at different locations with respect thereto.

22. The adjustable bracket assembly of claim 11, further comprising an aperture in one or both of said front bracket member and said rear bracket member for allowing wiring to be routed therethrough to said electronic display device.

23. An adjustable bracket assembly for mounting an electronic display device to a shelf having a top wall and at least front and rear walls extending downwardly therefrom to form a substantially bottomless shallow box of some length, depth and height, comprising:
a front bracket member having a substantially C-shaped distal end comprising horizontally oriented upper and lower legs connected at a distal end by a substantially vertical leg such that said distal end of said front bracket member slides over a front portion of said shelf that is formed by said top and front walls thereof, said lower leg further having a proximal end in the shape of a channel for slidably engaging a proximal end of a rear bracket member at a location beneath said shelf;
a rear bracket member having a proximal end shaped to slidably engage said proximal end of said front bracket member, and a distal end comprising a connector with a vertical rear leg oriented to extend upward into a hollow interior of said shelf, said vertical leg of a length such that a horizontally oriented upper leg that extends therefrom will mate with a similarly oriented bottom surface of a top wall of said shelf via a hole naturally present along a rear portion thereof when said front bracket member and said rear bracket member are properly assembled and installed thereto;

an electronic display mounting bracket having one face adapted for attachment to said front bracket member and a second face adapted for attachment to said electronic display device;

at least one fastener for securing said proximal ends of said front bracket member and said rear bracket member to each other;

a fastener for securing said distal end of said front bracket member to said top wall of said shelf by creating a clamping force therebetween; and a fastener for securing said horizontally oriented upper leg of said rear bracket member connector to said top wall of said shelf via said hole present along said rear portion thereof;

wherein the slidable engagement of said front bracket member and said rear bracket member allows said adjustable bracket assembly to be installed to shelves of varying width; and wherein the design of said front bracket member allows for useable shelf space behind said electronic display device after said adjustable bracket assembly and said electronic display device are installed to said shelf.

24. The adjustable bracket assembly of claim 23, wherein one or more of said front bracket member, said rear bracket member, and said electronic display mounting bracket are sheet metal formed.

25. The adjustable bracket assembly of claim 23, wherein one or more of said front bracket member, said rear bracket member, and said electronic display mounting bracket are of welded construction.

26. The adjustable bracket assembly of claim 23, wherein one or more of said front bracket member, said rear bracket member, and said electronic display mounting bracket are molded from a plastic material.

27. The adjustable bracket assembly of claim 23, wherein said fastener for securing said distal end of said rear bracket member to said top wall of said shelf is integral to said horizontally oriented upper leg of said connector of said distal end of said rear bracket member.

28. The adjustable bracket assembly of claim 23, further comprising an elongated slot in one or both of said lower leg of said front bracket member and said rear bracket member, said slot for receiving said at least one fastener for securing said proximal ends of said front bracket member and said rear bracket member to each other.

29. The adjustable bracket assembly of claim 23, wherein said elongated slot helps to guide sliding movement between said front bracket member and said rear bracket member.

30. The adjustable bracket assembly of claim 23, wherein said proximal end of said rear bracket member is also shaped in the form of a channel.

31. The adjustable bracket assembly of claim 23, further comprising a series of mounting holes in said front bracket member for attaching said electronic display mounting bracket at different locations with respect thereto.

32. The adjustable bracket assembly of claim 23, further comprising an aperture in one or both of said front bracket member and said rear bracket member for allowing wiring to be routed therethrough to said electronic display device.

* * * * *

UNITED STATES PATENT AND TRADEMARK OFFICE
CERTIFICATE OF CORRECTION

PATENT NO. : 7,316,378 B1 Page 1 of 1
APPLICATION NO. : 10/938104
DATED : January 8, 2008
INVENTOR(S) : Michael A. Curran et al.

It is certified that error appears in the above-identified patent and that said Letters Patent is hereby corrected as shown below:

In column 2, line 14, please delete "or" and insert -- of --.

In column 7, line 47, please delete "adjustment of" and insert -- adjustment to --.

Signed and Sealed this

Twenty-ninth Day of April, 2008

JON W. DUDAS
*Director of the United States Patent and Trademark Office*